Aug. 12, 1969

B. W. RONEY 3,460,873

BEARING OVERLOAD PROTECTION MEANS

Filed Oct. 26, 1967

INVENTOR.
BURTON W. RONEY
BY Herbert L. Davis

ATTORNEY

INVENTOR.
BURTON W. RONEY
BY Herbert L. Davis
ATTORNEY

Aug. 12, 1969  B. W. RONEY  3,460,873
BEARING OVERLOAD PROTECTION MEANS
Filed Oct. 26, 1967  3 Sheets-Sheet 3

INVENTOR.
BURTON W. RONEY
BY Herbert L. Davis

ATTORNEY

United States Patent Office 3,460,873
Patented Aug. 12, 1969

3,460,873
BEARING OVERLOAD PROTECTION MEANS
Burton W. Roney, Wayne, N.J., assignor to The Bendix Corporation, a corporation of Delaware
Filed Oct. 26, 1967, Ser. No. 678,246
Int. Cl. F16c *17/00, 19/50, 21/00*
U.S. Cl. 308—35                                    17 Claims

ABSTRACT OF THE DISCLOSURE

A bearing overload protection means in which axial and radial loads in excess of the load capacity of spindle or spin bearings are diverted from the bearings through a safety bearing structure without passing through the bearings supporting a rotor, wheel or shaft. The aforenoted overload protection means includes the provision of a rotor bearing structure and a safety bearing structure, the rotor bearing structure including ball bearings biased into a bearing relationship under a relatively light spring pressure, while the safety bearing structure includes other safety balls biased into a varying relationship in conical pockets under a relatively heavy spring pressure and further includes the provision of an intermediate housing to transfer an overload from the rotor bearing structure biased under the relatively light spring pressure to the safety bearing structure biased under a relatively heavy spring pressure.

Further, in the aforenoted intermediate housing the balls of the safety bearing structure are positioned in conical pockets provided in the intermediate bearing housing plate and in a housing plate carried by the main housing and positioned in spaced relation to the intermediate housing plate. The balls of the safety bearing structure being so arranged in the aforenoted conical pockets as to cam the intermediate housing plate in an axial direction apart from the main housing supported bearing plate so as to alleviate pressure applied to the rotor bearings by a radial overload so as to prevent damage to the rotor bearings by transferring the overload to the safety bearing structure.

CROSS-REFERENCE TO RELATED APPLICATIONS

The present invention relates to improvements in a rotor mounting of a type disclosed and claimed in a copending U.S. application Ser. No. 635,862 filed May 3, 1967 by Horace M. Varner and assigned to The Bendix Corporation, assignee of the present invention.

BACKGROUND OF THE INVENTION

Field of the invention

The invention is in the field of bearing overload protection and is specifically directed to an idea of means for protecting spindle or spin bearings supporting a rotor, wheel or shaft element from overloads in excess of either the axial or radial capacity of the bearings and thereby avoid the need for a bearing capacity over-design in the selection of such bearings with too great a load capacity which would otherwise result in unnecessary power consumption over long periods of operating time.

Description of the prior art

In rotor bearing structures embodied in outer space vehicles, it has been recognized that in view of launch vibration and shock $g$ levels and the amplification $q$ factor resulting from resonance within the assembly, some means of bearing protection against overload would be required to prevent the brinneling of the ball tracks of rolling bearings in such bearing structures and the resulting reduction of the life thereof.

A U.S. Patent No. 3,281,192 granted Oct. 25, 1966 to Jean Daubenfeld discloses an arrangement in which a pressure disk takes up the axial and radial overload, while a U.S. Patent No. 2,712,482 granted July 5, 1955 to Joseph Featonby shows recognition of the problem existing in protecting rotor ball bearings from overloads. The solution, however, in the latter patent is to balance the load between two balls rather than to remove the rotor ball bearing from the pressure of the applied overload.

A U.S. Patent No. 2,676,853 granted Apr. 27, 1954 to Julius E. Shafer discloses an idea of means for shifting the load from one bearing to another bearing in the case of off-center loads, but there is no suggestion in the patent with regard to saving the rotor bearing from damage due to an overload, while a U.S. Patent No. 3,183,043 granted May 11, 1965 to Larry D. Creeger and William S. Neff discloses an arrangement in which two bearing surfaces are provided in which one takes over, but only if the first becomes defective and which does not save the first bearing surface.

A U.S. Patent No. 2,886,380 granted May 12, 1959 to Adriaan J. J. Lambeck shows a pressure spring to hold a ball bearing in place, while U.S. Patent No. 2,626,842 granted Jan. 27, 1963 to Arthur W. Burks is an example of the use of pressure springs with ball bearings. Similarly, U.S. Patent No. 2,873,152 granted Feb. 10, 1959 to Earl A. Thompson and U.S. Patent No. 2,354,870 granted Aug. 1, 1944 to William Messinger and Alexander Shayne show springs used in balancing the forces applied in the axial or radial direction, but these latter references do not involve ball bearings.

Moreover, it is interesting to note that in none of the prior art patents is there any concept of the provision of springs applied so as to effect a shifting of an applied load from a normally operating rotor spin or spindle bearing of relatively limited load capacity to a safety bearing structure for carrying the excessive overload so as to protect the bearing from damage.

Moreover, while the idea of using an intermediate housing to transfer a load applied at a rotor shaft to a main housing may be broadly shown in the U.S. Patent No. 2,864,630 granted Dec. 16, 1958 to Victor W. Breitenstein and in a U.S. Patent No. 2,397,164 granted Mar. 26, 1946 to Julius E. Shafer, such prior patents fail to suggest the provision of an intermediate housing to transfer an overload from a spindle or spin bearings of a rotor element to a safety bearing structure in opposition to the biasing force of a relatively heavy spring pressure.

Furthermore, while a U.S. Patent No. 3,046,795 granted July 31, 1962 to John S. Wilkerson shows use of a conical bearing socket and an idea for camming two plates away from each other is shown in a U.S. Patent No. 2,009,964 granted July 30, 1935 to August J. Mottlau in a U.S. Patent No. 3,075,395 granted Jan. 29, 1963 to Gerald H. Leland et al., none of the disclosures of the prior art patents suggest that the camming action be utilized to alleviate an overload applied to a rotor spin bearing.

Indeed in the last Leland et al. patent, the purpose of the intermediate ball bearing is to increase the pressure applied to a plate, rather than to decrease or bypass the overload pressure applied on spindle or spin bearings for supporting a rotor element.

The aforenoted prior art patents are entirely devoid of the suggestion of any idea of means for protecting the rotor spindle or spin bearings by transferring an overload applied to such bearings to another safety bearing structure, as in the present invention.

SUMMARY OF THE INVENTION

The invention contemplates a simple mechanical structure in the mounting and assembly of a rotor within a casing or housing so as to provide a bearing overload protection means whereby non-operating or operating loads in excess of the axial and radial capacity of a rotor supporting spindle or spin bearing may be applied directly to a safety bearing structure carried by a casing without passing through or subjecting the rotor supporting bearing to the overload.

The invention further contemplates a rugged mechanical bearing assembly for mounting a high speed rotor which, for example, may be applicable to a gyroscope such as may be used in outer space vehicles or a reaction wheel utilized to vary the attitude of a space vehicle and in which bearing assembly there is provided an angular contact spin bearing at one side of the rotor to be preloaded by a relatively light belleville spring, which spring provides only sufficient force to maintain the ball to ball-track contact pressure angle of the ball bearings of the contact spin bearing under the maximum operating load, or any other single, double, or duplexed pair ball bearing, while an excess axial overload imposed during non-operating or operating vibration or shock serves to effectively transfer the overload through an outer bearing race of the spin bearing to a safety bearing structure carried by an intermediate housing biased into an operative relation by relatively heavy support springs and which intermediate housing is effective to translate axially against this heavy support spring, until a rotor axial shoulder bottoms out against a main housing structure of the bearing assembly.

It is a further object of invention to provide a rugged mechanical spin bearing assembly for mounting a high speed rotor or reaction wheel and in which bearing assembly there is provided a spin bearing at one side of the rotor, while upon an excess radial overload being imposed upon the rotor during non-operating or operating vibration, there is provided a safety bearing structure including an intermediate housing biased into an operative relation by a relatively heavy support spring and so arranged as to translate axially against the heavy support spring in response to the radial overloads due to the vibration or shock until a rotor shaft diameter bottoms out against a secondary bearing located in the housing structure. The secondary bearing may be of a sleeve, roller, or ball bearing type.

Another object of the invention is to provide a spin bearing overload protection means including a safety bearing structure whereby both excess radial and axial overloads may be transferred directly to a main housing supporting structure without passing through the rotor spin bearing.

Another object of the invention is to provide a spin bearing overload protection means including corresponding safety bearing structures at opposite ends of a rotor shaft, including similar means to protect the rotor spin bearings from excess axial overloads applied in opposite directions as well as from excess radial overloads resulting from axial and radial operational forces effective upon launching of an outerspace vehicle, or due to axial and/or radial vibrational or shock forces resulting in transient overload forces being applied to the rotor and thereby to the spin bearings supporting the rotor.

Another object of the invention is to provide novel means for affording protection for rotor bearings upon an overload being applied to the rotor in a radial direction through the provision of a safety bearing arrangement including two plates carrying a series of safety bearing support balls trapped between matching conical ball pockets provided in the two plates and so arranged as to effect an axial movement of one of the plates relative to the other of the plates upon the safety support balls being displaced radially on an overload being applied radially to the rotor while the plates remain in a parallel relation to each other during the excursion and cause the rotor radial overload to be effectively transferred from the rotor bearings through an outer bearing race thereof to the intermediate bearing housing so that as the load increases to a point approaching the maximum bearing radial capacity of the rotor bearings the safety balls will begin to climb the conical pockets and cause the two plates to be thereby cammed apart against the relatively heavy overload spring of the safety bearing structure until a rotor shaft radial protective bumper diameter bottoms radially in the bore sleeve or bearing of the main housing so that in no case would the rotor bearings be subject to an overload exceeding that represented by the safety bearing overload spring.

Furthermore, inasmuch as the axial overload capacity of an angular contact rotor spin bearing is normally greater than its radial overload capacity another object of the invention is to so select the angle of the conical pockets in the plates of the intermediate and outer bearing housings carrying the safety balls that axial displacement of the intermediate bearing housing plate relative to the outer bearing housing is effective at a lesser radial overload value than axial overload value and at such overload values corresponding to the respective radial overload and axial overload capacities of the rotor spin bearing therein provided.

Another object of the invention is to provide the radial-axial bumper bore of the aforenoted bearing overload protection means with suitable bearing material such as a self-lubricating bronze or other type axial and radial bearing means that even momentary operational overloads, such as might occur during the docking of the vehicle in space with another space vehicle, may be accepted without damage to the rotor bearing.

These and other objects and features of the invention are pointed out in the following description in terms of the embodiments thereof, which are shown in the accompanying drawings. Let it be understood, however, that the drawings are for the purpose of illustration only and are not a definition of the limits of the invention, reference being had to the appended claims for this purpose.

DESCRIPTION OF THE DRAWINGS

In the drawings, corresponding parts have been indicated by corresponding numerals throughout the several views and in which.

DESCRIPTION OF THE INVENTION

Figure 3:
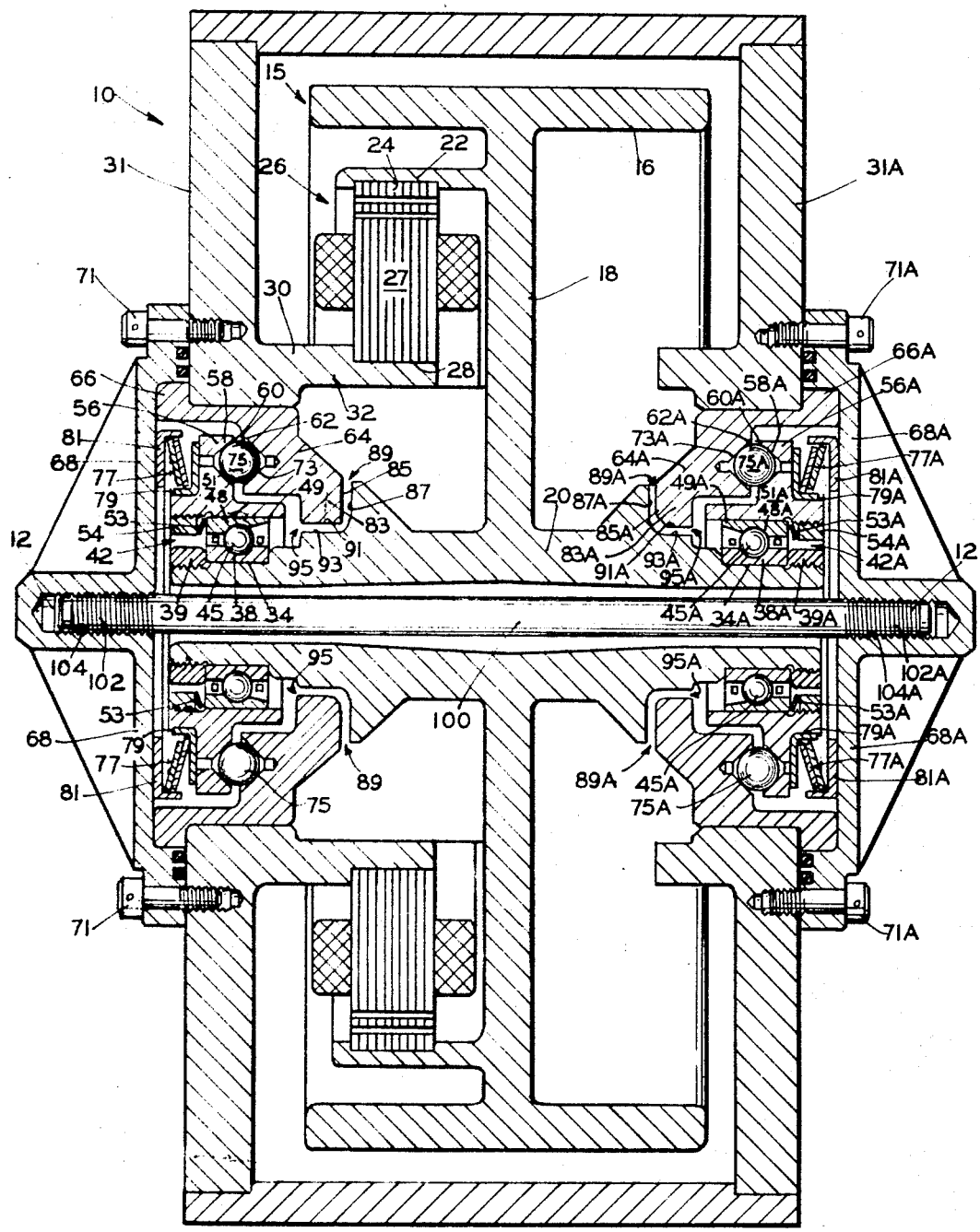
FIGURE 3 is a horizontal sectional view of a rotor, mounting assembly and housing embodying the bearing overload protection means of the present invention.

Referring to the drawings of FIGURE 3, the rotor and mounting assembly incorporated in the present invention is enclosed in a hollow housing 10 which may be rigidly mounted to a vehicle (not shown), as in the case of a single axis torque application, whereby a torque due to acceleration of a rotor 15 is applied about an axis 12, or the housing 10 may be pivotally mounted in a gimbal of a gyroscope in a conventional manner.

The rotor 15 mounted within the hollow housing 10 is essentially a homogeneous mass having a heavy outer rim portion 16 connected by a web 18 with a hollow rotor shaft 20 extending coaxial with the axis 12 of the rotor 15. An inner rim portion 22 extends coaxially from the web 18 and supports a conventional squirrel cage rotor 24 of an alternating current induction motor 26.

A stator portion 27 of the A.C. induction motor 26 is mounted on an undercut section 28 of a projecting shoulder 30 which extends inwardly from a fixed end portion 31 of the hollow housing 10. The projecting shoulder 30 is hollow forming a bore 32 coaxial with the axis 12.

The hollow rotor 15 is mounted for rotation within the casing 10 by means of the rotor shaft 20 which is journalled at opposite ends 34 and 34A so as to receive inner races 38 and 38A of angular contact type bearings 42 and 42A in abutting relationship cooperating with bearing balls 45 and 45A.

The inner races 38 and 38A are held in position by collars 39 and 39A screw threadedly engaged, respectively, in external screw threads provided at opposite ends of the rotor shaft 20. An outer bearing race 48 cooperates with the balls 45 and is slidably positioned in a bore 49 of an intermediate housing 51 under pressure of a relatively light preload belleville spring 53. The spring 53 is held in position by a collar 54 screw threadedly engaged in internal screw threads provided in the bore 49 of the intermediate housing 51.

In a similar manner, an outer race 48A of bearing 42A cooperates with the bearing ball 45A and is slidably positioned in a bore 49A of an intermediate housing 51A under pressure of a relatively light preload belleville spring 53A. The spring 53A is held in position by a collar 54A screw threadedly engaged in internal screw threads provided in the bore 49A of the intermediate housing 51A.

Further projecting radially from the intermediate housing 51 is an annular flange plate 56 having provided therein a plurality of conical ball pockets 58 annularly arranged in equal spaced relation in a side surface 60 of the plate 56 about the axis 12.

The side surface 60 of the plate 56 is positioned in spaced relation to a side surface 62 of an outer bearing housing 64 having an angular lip portion 66 secured between the fixed end portion 31 of the hollow housing 10 and a plate 68 secured to the end portion 31 of the housing 10 and held in place by lock bolts 71 screw threadedly engaged in the fixed end portion 31 of the housing 10.

Further provided in the side surface 62 of the outer bearing housing 64 are a plurality of conical ball pockets 73 annularly arranged in equal spaced relation about the axis 12 and correspondingly located to the conical ball pockets 58 provided in the side surface 60 of the plate 56. Further positioned in the corresponding conical ball pockets 58 and 73 are safety balls 75 biased into contacting relation with the side surfaces of the conical ball pockets 58 and 73 under pressure of a heavy overload belleville spring 77 which bears at one edge upon a ring 79 carried by the intermediate bearing housing 51 while an opposite edge of the belleville spring 77 bears upon a second ring 81 resting upon the plate 68.

A like spin bearing overload protection means is provided at the opposite end of the rotor shaft 20 in which the intermediate housing 51A includes an annular plate 56A having provided therein a plurality of conical ball pockets 58A angularly arranged in equal spaced relation in a side surface 60A of the plate 56A about the axis 12.

The side surface 60A of the plate 56A is positioned in spaced relation to a side surface 62A of an outer bearing housing 64A having an angular lip portion 66A secured between the fixed end portion 31A of the bearing housing 10 and a plate 68A secured to the end portion 31A of the housing 10 and held in place by lock screws 71A screw threadedly engaged in the fixed end portion 31A of the housing 10.

Further provided in the side surface 62A of the outer bearing housing 64A are a plurality of conical ball pockets 73A annularly arranged in equal spaced relation about the axis 12 and correspondingly located to the conical ball pockets 58A provided in the side surface 60A of the plate 56A. Further positioned in the corresponding conical ball pockets 58A and 73A are safety balls 75A biased into contacting relation with the side surfaces of the conical ball pockets 58A and 73A under pressure of a heavy overload belleville spring 77A which bears at one edge upon a ring 79A carried by the intermediate bearing housing 51A while an opposite edge of the belleville spring 77A bears upon a second ring 81A resting upon the plate 68A.

Figure 1:
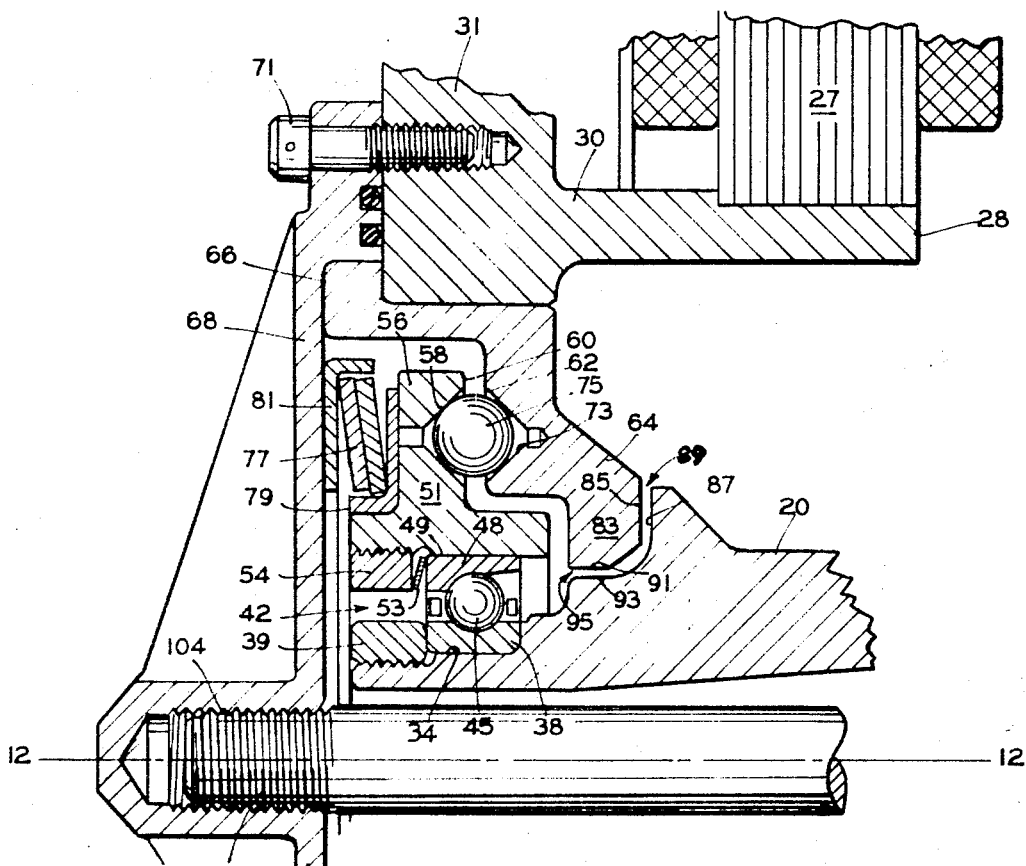
FIGURE 1 is a fragmentary sectional view of a bearing arrangement embodying the bearing overload protection means of the present invention.

As shown by FIGURES 1 and 3, annular end portions 83 and 83A of the outer bearing housing 64 and 64A, respectively, have surfaces 85 and 85A positioned in axial spaced relation to annular surfaces 87 and 87A, respectively, adjacent opposite end portions of the rotor shaft 20 so as to provide in normal operation axial bumper gaps 89 and 89A between the opposite surfaces 87 and 87A of the shaft 20 and the surfaces 85 and 85A of the end portions 83 and 83A of the outer bearing housing 64 and 64A, while radial inner surfaces 91 and 91A of the annular end portions 83 and 83A of the outer bearing housing 64 and 64A, respectively, are positioned in spaced relation to corresponding radial outer surfaces 93 and 93A provided on the rotor shaft 20 adjacent the opposite end portions thereof so as to provide in normal operation radial bumper gaps 95 and 95A, respectively.

The respective axial bumper gaps 89 and 89A limit axial movement of the rotor shaft 20 in opposite axial senses relative to the outer bearing housing 64 and 64A, respectively, upon an overload in an axial sense being applied thereto while the radial bumper gaps 95 and 95A limit radial movement of the rotor shaft 20 in opposite radial senses relative to the outer bearing housing 64 and 64A, respectively, upon an overload in a radial sense being applied thereto, as hereinafter explained in greater detail.

As best shown in FIGURE 3, a rigid strut member 100 extends from the plate 68 which is secured to the end portion of the housing 10 and through the hollow rotor shaft 20 to the end plate 68A which is in turn secured to the opposite end portion 31A of the housing 10. The strut member 100 has suitable screw threaded end prtions 102 and 102A which are in turn screw threadedly engaged in internal screw threads 104 and 104A provided respectively in the end plates 68 and 68A.

As heretofore explained with reference to a corresponding strut rod provided in the copending U.S. application Ser. No. 635,862 filed May 3, 1967 by Horace M. Varner and assigned to The Bendix Corporation the strut rod 100 serves to support the housing 10 against any atmospheric pressure differential, controlling temperature expansion across the housing 10, and transferring axial loads equally to both sides 31 and 31A of the structure of the housing 10.

A feature of the present invention resides in the provision of a spin bearing overload protection means effective to protect the spin bearings from overloads applied in an axial sense and also from overloads applied in a radial sense.

OPERATION

In the operation of the invention, it will be seen that upon an excess axial overload being imposed as during non-operating vibration, one of the outer bearing races 48 or 48A depending upon the direction of the applied overload, will tend to flatten the adjacent light bearing preload spring 53 or 53A, while the other opposite outer bearing races 48 or 48A, as the case may be, will tend to move axially in the bore 49 of the intermediate bearing housing 51.

The flattening of the light bearing preload spring 53 or 53A will transfer the applied overload through the corresponding outer race 48 or 48A of the spin bearing to the corresponding intermediate housing 51 or 51A so that this housing in turn translates axially against its heavy support spring 77 or 77A until the corresponding axial bumper surface 87 or 87A provided on the rotor shaft 20 in spaced relation to the annular surface 85 and 85A of the outer bearing housing 64 or 64A is caused to contact or bottom out against the bearing housing structure to close the axial bumper gap 89 or 89A due to an axial movement of the shaft 20 in one axial sense or the other axial sense resulting from the axial overload forces being applied thereto.

Thus all such excess axial rotor load is transferred directly to the fixed housing structure 64 or 64A without passing through the rotor spin bearing 42 or 42A, as the case may be, so as to prevent the overload from causing damage thereto.

Thus the overload bearing arrangement adjacent the one end of the rotor shaft 20 serves to protect the spin bearing from an overload applied in one axial direction, while the overload bearing arrangement adjacent the opposite end of the rotor shaft 20 contains a similar bearing overload protection means to prevent damage to the bearing upon an axial overload being applied in an opposite direction.

In providing protection of the bearing upon the overload being applied in a radial direction, it will be seen that the two plates 56 and 64, as shown, for example in FIGURE 1, each contain a series of support or safety balls 75 which are trapped between matching conical ball pockets 58 and 73 so arranged that the safety balls 75 will cause the plates 56 and 64 to further separate axially when the safety balls 75 are displaced radially upon radial overload forces being applied thereto.

Thus the plate 56 will be biased axially in opposition to the pressure applied by the relatively heavy overload spring 77, algthough the plates 56 and 64 will remain parallel to each other during such excursion period.

Thus a radial load applied to the rotor 20 will be transferred through the outer race 48 of the spin bearing 42 to the intermediate bearing housing 51 and as the load increases to the maximum radial capacity of the spin bearing, the safety balls 75 will begin to climb surfaces of the conical pockets 58 and 73 in the respective plates 56 and 64 causing the plates 56 and 64 to be thereupon cammed apart by the action of the safety balls 75 while the overload spring 77 will be further compressed until outer radial surface 93 of the rotor shaft 20 bottoms radially on the internal radial surface 91 of the outer bearing housing 64.

It may be seen that the excess radial load is transferred directly to the outer bearing housing 64 and thereby to the fixed housing 10 without passing through the spin bearing 42. In no case is the spin bearing 42 subjected to a load in excess of that represented by the overload spring 77 which is so selected as to provide adequate protection with respect to the specific capacity of the spin bearing 42.

Similar axial and radial overload protection means are provided for the spin bearing 42A to that provided for the spin bearing 42. Thus as shown by FIGURE 3, with reference to the spin bearing 42A, corresponding parts have been indicated by like numerals with the suffix A to indicate those corresponding parts heretofore described with reference to the overload protection means for the spin bearing 42.

Moreover, while the radial capacity of the spin bearings 42 and 42A may be somewhat less than the axial capacity of these spin bearings, the cone angle of the ball pockets 58 and 73 and 58A and 73A may be so set, that a radial displacement of housing 51 and 51A will be effected upon a radial overload being applied to the rotor shaft 20 of a value less than the value of the critical axial overload.

Thus the balls 75 and 75A under such radial overload will be biased outwardly of the shaft 20 so as to tend to climb the surfaces of the respective conical pockets 58 and 73, and 58A and 73A extending outwardly of the rotor shaft 20. Such radial overload force will then cause the balls 75 and 75A in climbing such conical surfaces of the pockets to effectively displace the intermediate bearing housing 51 and 51A axially in relation to the outer bearing housing 64 and 64A in opposition to the biasing force of the respective overload protection springs 77 and 77A. Thereupon the radial surfaces 93 and 93A of the shaft 20 bottoms on the inner radial surfaces or bores 91 and 91A of the outer bearing housing 64 and 64A, respectively, closing the radial bumper gaps 95 and 95A.

Moreover, due to the leverage effect provided by the preset angular relation of the conical surfaces of the ball pockets to the safety balls 75 and 75A, the wedging action of the safety balls 75 and 75A on the plates 51 and 51A will effect a closure of the radial bumper gaps 95 and 95A at a relatively lower overload force applied in the radial direction than the overload force required in an axial direction to effect a closure of the axial bumper gap 89 or 89A, as the case may be.

The respective axial and radial overload values at which the closure of the axial and radial bumper gaps are effected are so selected as to be slightly less than the respective axial and radial overload capacities of the spin bearings 42 and 42A so to prevent an overload in either sense from being applied to the spin bearings 42 and 42A in excess of the respective overload capacities thereof and thereby prevent damage thereto by the applied overload.

In addition, it may be seen that no rotor displacement will occur in either the radial or axial directions during normal operation. Precise bearing alignment and concentricity will be maintained during normal operation by the inherent centering and locating action of the ball and conical pocket arrangement. Furthermore, following overload displacement, restoration of original alignment, concentricity and position will be accomplished by the device.

MODIFIED FORMS OF FIGURES 4 AND 5

Figure 4:
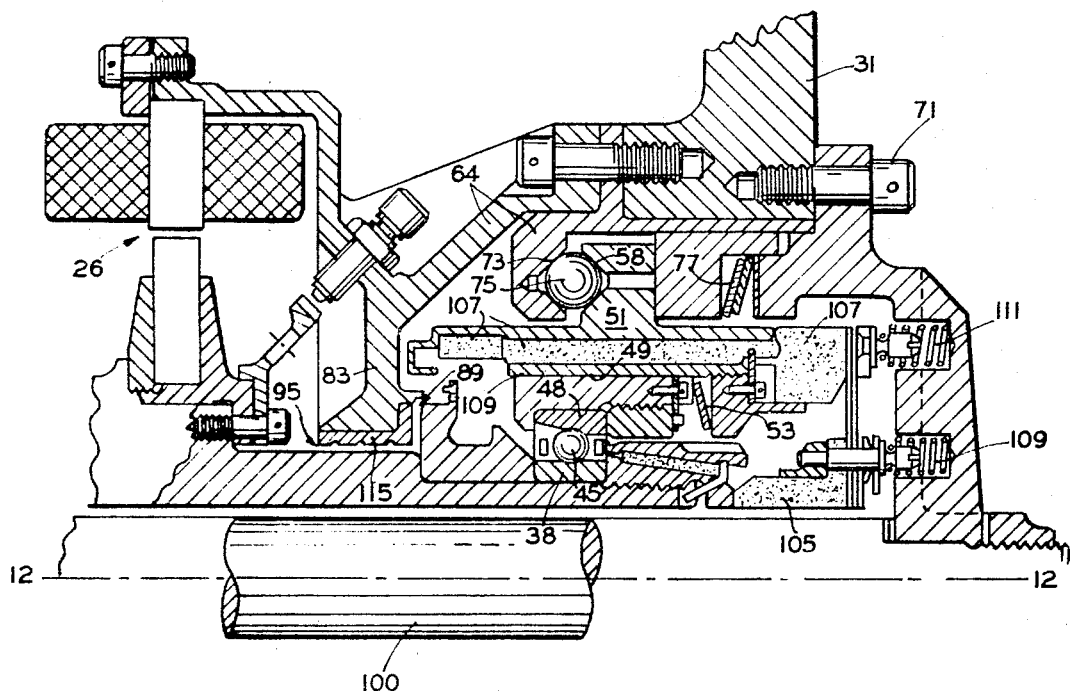
FIGURE 4 is a fragmentary sectional view of a bearing arrangement embodying a modified form of the spin bearing overload protection means of the present invention.

A modified form of the invention is shown in FIGURE 4 in which corresponding parts to those heretofore described with reference to FIGURES 1–3 have been indicated by like numerals.

In addition, in the modified form of the invention of FIGURE 4, there is indicated by the numerals 105 and 107 suitable felt lubricating rings held under tension by spring elements 109 and 111 so as to supply lubricating oil to the bearings.

As shown in FIGURE 4, the bearing 42 has an inner race 38 and an outer race 48 arranged in cooperative relation with bearing balls, one of which is indicated by numeral 45. The outer race 48 is slidably positioned in a bore 49 provided in the intermediate housing 51.

Further the axial bumper gap 89 and the radial bumper gap 95 of the modified form of the invention of FIGURE 4 is defined by a bearing sleeve 115 of a suitable self-lubricating material such as bronze or there may be provided in the radial-axial bumper bore other types of anti-friction bearings so arranged that even momentary operational overloads may be acceptable without friction galling of the radial-axial bumper gaps under conditions such as might occur, for example, during docking in space of a vehicle in which the device may be an operational part.

Figure 5:
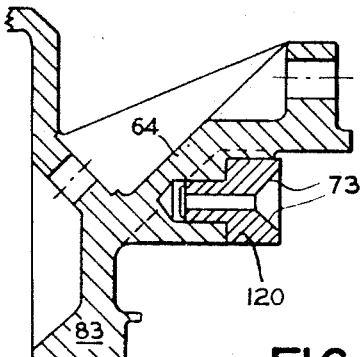
FIGURE 5 is a fragmentary sectional view of a modified form of the intermediate bearing housing of FIGURE 4.

The fragmentary view of FIGURE 5, illustrates a modification of the form of the invention of FIGURE 4 in which the outer bearing housing 64 may be formed of aluminum while steel inserts 120 may be provided with conical surfaces forming the conical ball pockets 73 for receiving the safety balls 75, as heretofore described.

Figure 2:
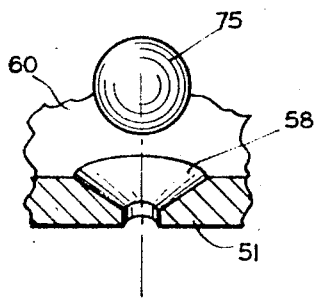
FIGURE 2 is a cross-sectional view of one of the conical pockets of the intermediate housing of FIGURE 1 with a safety ball shown in a displaced relation thereto.

The operation of the modified forms of the invention of FIGURES 4 and 5 will be otherwise substantially the same as the form of the invention of FIGURES 1–3, as heretofore explained.

Although several embodiments of the invention have been illustrated and described, various changes in the form and relative arrangements of the parts, which will now appear to those skilled in the art may be made without departing from the scope of the invention.

What is claimed is:

1. In a rotor mounting assembly of a type including a supporting means, a rotor including a shaft mounted for rotation relative to said supporting means, bearing means of a limited overload capacity positioned adjacent pposite ends of the shaft and between the supporting means and the shaft, a pair of bearing overload protection devices, one of said devices associated in cooperative relation with each of the bearing means at opposite ends of the rotor shaft, each of said overload protection devices including a first means to maintain the associated bearing means in a predetermined operative relation to the rotor shaft and supporting means during normal operation, spring means biasing said first means to a first position for effecting the predetermined operative relation of the associated bearing means during said normal operation, and said first means being displaced to a second position in opposition to the biasing force of said spring means in response to an overload being applied to the bearing means in excess of said limited capacity of the bearing means, and second means effective upon the first means being displaced to the second position to cause the supporting means to support the excess overload so as to prevent damage to the bearing means by the overload; the improvement comprising the first means of each bearing overload protection device including a pair of control plates, one of said plates being carried by the supporting means and the other of said plates being carried by the bearing means associated with the overload protection device, each of said control plates having corresponding conical pockets provided therein and arranged in said plates in opposite relation, and safety balls positioned in said pockets between said plates; said spring means biasing said other plate to a first position and toward said one plate with the safety balls being biased into contacting relation with surfaces of the conical pockets provided in said plates so as to maintain the bearing means associated with said other control plate in said predetermined operative relation during said normal operation, said other control plate being displaced to a second position in opposition to the biasing force of said spring means in response to an overload being applied to the associated bearing means in excess of said limited capacity thereof, and the displacement of said other plate to said second position rendering said second means effective to cause the supporting means to carry the excess overload so as to prevent damage to the bearing means by the overload.

2. The improvement defined by claim 1 in which said spring means includes a first spring element biasing said other plate of the first means associated with one of said bearing means in one sense, and a second spring element biasing the other plate of the first means associated with the other of said bearing means in an opposite sense, the second means associated with said one bearing means being rendered effective to cause the supporting means to carry the excess overload upon an axial overload in one sense being applied to said one bearing means in excess of the limited capacity thereof and in opposition to the biasing force of said first spring element, and the second means associated with said other of the bearing means being rendered effective to cause the supporting means to carry the excess overload upon an axial overload in an opposite sense being applied to said other bearing means in excess of the limited capacity thereof and in opposition to the biasing force of said second spring element.

3. The improvement defined by claim 1 in which said spring means includes a first spring element biasing said other plate of the first means associated with one of said bearing means in one sense, and a second spring element biasing the other plate of the first means associated with the other of said bearing means in an opposite sense, the second means associated with said one bearing means being rendered effective to cause the supporting means to carry the excess overload upon a radial overload being applied to said one bearing means in excess of the limited capacity thereof and in opposition to the biasing force of said first spring element, and the second means associated with said other of the bearing means being rendered effective to cause the supporting means to carry the excess overload upon a radal overload being applied to said other bearing means in excess of the limited capacity thereof and in opposition to the biasing force of said second spring element.

4. The improvement defined by claim 1 in which said spring means includes a first spring element biasing said other plate of the first means associated with one of said bearing means in one sense, and a second spring element biasing the other plate of the first means associated with the other of said bearing means in an opposite sense, the second means associated with said one bearing means being rendered effective to cause the supporting means to carry the excess overload upon either an axial or a radial overload being applied to said one bearing means in excess of the limited capacity thereof and in opposition to the biasing force of said first spring element, and the second means associated with said other of the bearing means being rendered effective to cause the supporting means to carry the excess overload upon either an axial or a radial overload being applied to said other bearing means in excess of the limited capacity thereof and in opposition to the biasing force of said second spring element, and upon withdrawal of the effective overload the spring means causes a return displacement of the other plate from the second position to the first position so as to effect the alignment and concentricity of the associated bearing means relative to the rotor shaft and supporting means during normal operation.

5. The improvement defined by claim 1 in which the second means of each bearing overload protection device includes a first surface on the rotor shaft, and a second surface on said one plate arranged in a predetermined spaced relation to said first surface upon the other plate being in said first position, and upon an overload being applied to the associated bearing means in excess of the limited overload capacity thereof the displacement of the other plate associated therewith to said second position thereupon permits the first surface under force of such excessive overload to close the space relation with said second surface and to be displaced into a contacting relation with said second surface so as to thereupon cause the supporting means to effectively support through the contacting first and second surfaces the excess overload so as to prevent damage to the bearing means by the overload.

6. The improvement defined by claim 1 in which the second means of each bearing overload protection device includes a first surface on the rotor shaft, and a second surface on said one plate arranged in a predetermined axial spaced relation to said first surface upon the other plate being in said first position, and upon an axial overload being applied to the associated bearing means in excess of the limited overload capacity thereof the displacement of the other plate associated therewith to said second position thereupon permits the first surface under force of such excessive axial overload to close the space relation with said second surface and to be displaced into a contacting relation with said second surface so as to thereupon cause the supporting means to effectively support through the contacting first and second surfaces the excess overload so as to prevent damage to the bearing means by the overload.

7. The improvement defined by claim 1 in which the second means of each bearing overload protection device includes a first surface on the rotor shaft, and a second surface on said one plate arranged in a predetermined radial spaced relation to said first surface upon the other plate being in said first position, and upon a radial overload being applied to the associated bearing means in excess of the limited overload capacity thereof the displacement of the other plate associated therewith to said second position thereupon permits the first surface under force of such excessive radial overload to close the space relation with said second surface and to be displaced into a contacting relation with said second surface so as to thereupon cause the supporting means to effectively support through the contacting first and second surfaces the excess overload so as to prevent damage to the bearing means by the overload.

8. The improvement defined by claim 4 in which the second means of each bearing overload protection device includes a first surface on the rotor shaft, and a second surface on said one plate arranged in a predetermined axial and radial spaced relation to said first surface upon the other plate being in said first position, and upon either an axial or radial overload being applied to the associated bearing means in excess of the limited overload capacity thereof the displacement of the other plate associated therewith to said second position thereupon permits the first surface under force of such excessive axial or radial overload to close the space relation with said second surface and to be displaced into a contacting relation with said second surface so as to thereupon cause the supporting means to effectively support through the contacting first and second surfaces the excess overload so as to prevent damage to the bearing means by the overload.

9. In a rotor mounting assembly of a type including a supporting means, a rotor including a shaft mounted for rotation relative to said supporting means, bearing means of a limited overload capacity positioned adjacent opposite ends of the shaft and between the supporting means and the shaft, a pair of bearing overload protection devices, one of said devices associated in cooperative relation with each of the bearing means at opposite ends of the rotor shaft, each of said overload protection devices including a first means to maintain the associated bearing means in a predetermined operative relation to the rotor shaft and supporting means during normal operation, spring means biasing said first means to a first position for effecting the predetermined operative relation of the associated bearing means during said normal operation, and said first means being displaced to a second position in opposition to the biasing force of said spring means in response to an overload being applied to the bearing means in excess of said limited capacity of the bearing means, and second means effective upon the first means being displaced to the second position to cause the supporting means to support the excess overload so as to prevent damage to the bearing means by the overload; the improvement comprising the second means by the overload; the improvement comprising the second means of each bearing overload protection device includes a first surface on the rotor shaft, a second surface on the supporting means arranged in a predetermined spaced radial relation to said first surface upon said first means being in said first position, and control means operatively carried by the supporting means and the bearing means and effective to bias the first means in opposition to the biasing force of the spring means upon a radial overload being applied to the associated bearing means in excess of the limited overload capacity thereof so as to cause the displacement of the first means to said second position which thereupon permits the first surface under force of such excessive radial overload to close the space relation with said second surface and to be displaced into a contacting relation with said second surface so as to thereupon cause the supporting means to effectively support through the contacting first and second surfaces the excess radial overload so as to prevent damage to the bearing means by the overload.

10. In a rotor mounting assembly of a type including a supporting means, a rotor including a shaft mounted for rotation relative to said supporting means, bearing means of a limited overload capacity positioned adjacent opposite ends of the shaft and between the supporting means and the shaft, a pair of bearing overload protection devices, one of said devices associated in cooperative relation with each of the bearing means at opposite ends of the rotor shaft, each of said overload protection devices including a first means to maintain the associated bearing means in a predetermined operative relation to the rotor shaft and supporting means during normal operation, spring means biasing said first means to a first position for effecting the predetermined operative relation of the associated bearing means during said normal operation, and said first means being displaced to a second position in opposition to the biasing force of said spring means in response to an overload being applied to the bearing means in excess of said limited capacity of the bearing means, and second means effective upon the first means being displaced to the second position to cause the supporting means to support the excess overload so as to prevent damage to the bearing means by the overload; the improvement comprising the second means of each bearing overload protection device including a first surface on the rotor shaft, a second surface on the supporting means arranged in a predetermined spaced axial and radial relation to said first surface upon said first means being in said first position, and upon either an axial or radial overload being applied to the associated bearing means in excess of the limited overload capacity thereof the displacement of the first means to said second position thereupon permits the first surface under force of such excessive axial or radial overload to close the space relation with said second surface and to be displaced into a contacting relation with said second surface so as to thereupon cause the supporting means to effectively support through the contacting first and second surfaces the excess overload so as to prevent damage to the bearing means by the overload.

11. In a bearing assembly of a type including a bearing means having a limited overload capacity, means for supporting said bearing means, and a shaft rotatably mounted in said bearing means, first control means carried by the supporting means and operatively positioned to a first and second position, spring means biasing the first control means to a first position, the first control means being effective in said first position to maintain the bearing means in a predetermined operative relation to the shaft and supporting means during normal operation, said first control means being releasably displaced from said first position to a second position in opposition to the biasing force of said spring means in response to an overload being applied to said bearing means in excess of said limited capacity of the bearing means, and second control means operative to said shaft and effective upon the first control means being displaced to the second position to cause the supporting means to support the excess overload so as to prevent damage to the bearing means by the overload; the improvement comprising the first control means including a pair of control plates, one of said control plates being carried by the supporting means and another of said control plates being carried by the bearing means, said control plates carrying releasable means for actuating the other of said control plates so as to be displaced from a first to a second position; said spring means biasing said other control plate to the first position so as to maintain the bearing means in said predetermined operative relation during said normal operation, said other control plate being displaced to the second position in opposition to the biasing force of said spring means by the releasable actuating means in response to an overload being applied to the bearing means in excess of said limited capacity thereof, and the displacement of said other control plate to said second position rendering said second control means effective to cause the supporting means to carry the excess overload so as to prevent damage to the bearing means by the overload.

12. The improvement defined by claim 11 in which the second control means includes a first surface on the shaft and a second surface on said one control plate, said second surface being arranged in a predetermined spaced relation to said first surface upon the other control plate being in said first poseition, and the displacement of the other control plate to said second position thereupon permits the first surface under force of an excessive overload to be displaced into a contacting relation with said second surface so as to cause the supporting means to effectively support through the contacting first and second surfaces the excess overload so as to prevent damage to the bearing means by such overload.

13. The improvement defined by claim 11 in which the second control means includes a first surface on the shaft, and a second surface on said one control plate, said second surface being arranged in a predetermined axial spaced relation to said first surface upon the other control plate being in said first position, and an axial diseplacement of the other control plate to said second position thereupon permits the first surface under force of an excessive axial overload to be displaced into a contacting relation with said second surface so as to cause the supporting means to effectively support through the contacting first and second surfaces the excess axial overload so as to prevent damage to the bearing means by such axial overload.

14. The improvement defined by claim 11 in which the second control means includes a first surface on the shaft, and a second surface on said one control plate, said second surface being arranged in a predetermined radial spaced relation to said first surface upon the other control plate being in said first position, and a radial displacement of the other control plate to said second position thereupon permits the first surface under force of an excessive radial overload to be displaced into a contacting relation with said second surface so as to cause the supporting means to effectively support through the contacting first and second surfaces the excess radial overload so as to prevent damage to the bearing means by such radial overload.

15. The improvement defined by claim 11 in which the second control means includes a first surface on the shaft, and a second surface on said one control plate, said second surface being arranged in a predetermined axial and radial spaced relation to said first surface upon the other control plate being in said first position, and either an axial or radial displacement of the other control plate to said second position thereupon permits the first surface under force of a corresponding excess axial or radial overload to be displaced into a contacting relation with said second surface so as to cause the supporting means to effectively support through the contacting first and second surfaces such excess overload so as to prevent damage to the bearing means by such overload.

16. In a bearing assembly of a type including a bearing means having a limited overload capacity, means for supporting said bearing means, and a shaft rotatably mounted in said bearings means, first control means carried by the supporting means and operatively positioned to a first and second position, spring means biasing the first control means to a first position, the first control means being effective in said first position to maintain the bearing means in a predetermined operative relation to the shaft and supporting means during normal operation, said first control means being releasably displaced from said first position to a second position in opposition to the biasing force of said spring means in response to an overload being applied to said bearing means in excess of said limited capacity of the bearing means, and second control means operative by said shaft and effective upon the first control means being displaced to the second position to cause the supporting means to support the excess overload so as to prevent damage to the bearing means by the overload; the improvement comprising the second control means including a first surface on the shaft, a second surface on the supporting means arranged in a predetermined spaced radial relation to said first surface upon said first control means being in said first position, and upon a radial overload being applied to the bearing means in excess of the limited overload capacity thereof the displacement of the first control means to said second position thereupon permits the first surface under force of such excessive radial overload to be displaced into a contacting relation with said second surface so as to thereupon cause the supporting means to effectively support through the contacting first and second surfaces the excess radial overload so as to prevent damage to the bearing means by such overload.

17. In a bearing assembly of a type including a bearing means having a limited overload capacity, means for supporting said bearing means, and a shaft rotatably mounted in said bearing means, first control means carried by the supporting means and operatively positioned to a first and second position, spring means biasing the first control means to a first position, the first control means being effective in said first position to maintain the bearing means in a predetermined operative relation to the shaft and supporting means during normal operation, said first control means being releasably displaced from said first position to a second position in opposition to the biasing force of said spring means in response to an overload being applied to said bearing means in excess of said limited capacity of the bearing means, and second control means operative by said shaft and effective upon the first control means being displaced to the second position to cause the supporting means to support the excess overload so as to prevent damage to the bearing means by the overload; the improvement comprising the second control means including a first surface on the shaft, a second surface on the supporting means arranged in a predetermined spaced axial and radial relation to said first surface upon said first control means being in said first position, and upon either an axial or radial overload being applied to the bearing means in excess of the limited overload capacity thereof the displacement of the first control means to said second position thereupon permits the first surface under force of either of such excessive axial or radial overload to be displaced into a contacting relation with said second surface so as to thereupon cause the supporting means to effectively support through the contacting first and second surfaces such excess overload so as to prevent damage to the bearing means by the overload.

References Cited

UNITED STATES PATENTS 2,875,001  2/1959  Miller et al. _____ 308—35

MARTIN P. SCHWADRON, Primary Examiner

F. SUSKO, Assistant Examiner

PO-1050
(5/69)

UNITED STATES PATENT OFFICE
CERTIFICATE OF CORRECTION

Patent No. 3,460,873          Dated August 12, 1969

Inventor(s) Burton W. Roney

It is certified that error appears in the above-identified patent and that said Letters Patent are hereby corrected as shown below:

In claim 1, column 9, line 9 "pposite" changed to -- opposite --.

In claim 2, column 9, line 52 numeral "8" changed to -- 2 --.

In claim 3, column 10, line 11 "radal" changed to -- radial --.

In claim 11, column 12, line 58 the word "to" changed to -- by --.

SIGNED AND
SEALED

OCT 28 1969

(SEAL)
Attest:

Edward M. Fletcher, Jr.
Attesting Officer

WILLIAM E. SCHUYLER, JR.
Commissioner of Patents